United States Patent
Raviv et al.

(10) Patent No.: US 12,469,048 B2
(45) Date of Patent: Nov. 11, 2025

(54) SYSTEM AND METHOD FOR DYNAMIC BUDGET CONTROL

(71) Applicant: Yahoo Ad Tech LLC, New York, NY (US)

(72) Inventors: Ariel Raviv, Haifa (IL); Rotem Stram, Haifa (IL)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 18/515,960

(22) Filed: Nov. 21, 2023

(65) Prior Publication Data

US 2025/0166006 A1    May 22, 2025

(51) Int. Cl.
*G06Q 30/0241* (2023.01)

(52) U.S. Cl.
CPC ................. *G06Q 30/0249* (2013.01)

(58) Field of Classification Search
None
See application file for complete search history.

(56) References Cited

U.S. PATENT DOCUMENTS

| | | | |
|---|---|---|---|
| 11,315,145 B1 * | 4/2022 | Knijnik | G06N 20/00 |
| 11,514,478 B1 * | 11/2022 | Paran | G06Q 30/0275 |
| 2012/0041816 A1 | 2/2012 | Buchalter | |
| 2012/0084125 A1 * | 4/2012 | Chan | G06Q 30/0241 |
| | | | 705/14.4 |
| 2015/0081425 A1 * | 3/2015 | Siegman | G06Q 30/02 |
| | | | 705/14.46 |
| 2015/0220976 A1 * | 8/2015 | Guo | G06Q 30/0273 |
| | | | 705/14.48 |
| 2016/0162955 A1 | 6/2016 | O'Kelley et al. | |
| 2018/0005314 A1 | 1/2018 | Li et al. | |
| 2019/0066200 A1 * | 2/2019 | Deagan | G06Q 30/08 |
| 2019/0355010 A1 * | 11/2019 | Peterson | G06Q 30/0273 |
| 2020/0273095 A1 | 8/2020 | Koren et al. | |
| 2024/0069972 A1 * | 2/2024 | Han | G06Q 40/02 |

OTHER PUBLICATIONS

Chong-Rui, Zhang: "Optimized Bidding Algorithm of Real Time Bidding in Online Ads Auction", Aug. 1, 2014, 2014 International Conference on Management Science & Engineering 21th Annual Conference Proceedings, pp. 33-42, 10 pages (Year: 2014).

* cited by examiner

*Primary Examiner* — Allan J Woodworth, II
(74) *Attorney, Agent, or Firm* — Cooper Legal Group LLC

(57) ABSTRACT

One or more computing devices, systems, and/or methods are provided. In an example, a first budget is determined for a first instance of a first time period. A pacing system, that is configured to pace spending over a time period based upon a budget, is controlled to spend on transmission of content to a first plurality of client devices using the first budget during the first instance of the first time period. Feedback indicating a rate of spending associated with the transmission of content to the first plurality of client devices is received. Using the feedback, the first budget is updated to determine a second budget for a second instance of the first time period. The pacing system is controlled to spend on transmission of content to a second plurality of client devices using the second budget during the second instance of the first time period.

20 Claims, 9 Drawing Sheets

800 →

| Day | Pacing Signal |
|---|---|
| Sunday | 0.7 |
| Monday | 0.4 |
| Tuesday | 0.45 |
| Wednesday | 0.35 |
| Thursday | 0.2 |
| Friday | 0.5 |
| Saturday | 0.6 |

FIG. 8A

SYSTEM AND METHOD FOR DYNAMIC BUDGET CONTROL

BACKGROUND

Many applications, such as websites, applications, etc. may provide platforms for viewing media. For example, a user may interact with a service. While interacting with the service, selected media may be presented to the user automatically.

SUMMARY

In accordance with the present disclosure, one or more systems, computing devices and/or methods are provided. In an example, a content distribution system comprises a pacing system and a dynamic budget control system. The pacing system is configured to pace spending over a time period based upon a budget. The dynamic budget control system is configured to (i) determine a first budget for a first instance of a first time period, (ii) control the pacing system to spend on transmission of content to a first plurality of client devices using the first budget during the first instance of the first time period, (iii) receive feedback indicating a rate of spending associated with the transmission of content to the first plurality of client devices, (iv) update, using the feedback, the first budget to determine a second budget for a second instance of the first time period, and/or (v) control the pacing system to spend on transmission of content to a second plurality of client devices using the second budget during the second instance of the first time period.

In an example, a first budget is determined for a first instance of a first time period. A pacing system, that is configured to pace spending over a time period based upon a budget, is controlled to spend on transmission of content to a first plurality of client devices using the first budget during the first instance of the first time period. Feedback indicating a rate of spending associated with the transmission of content to the first plurality of client devices is received. Using the feedback, the first budget is updated to determine a second budget for a second instance of the first time period. The pacing system is controlled to spend on transmission of content to a second plurality of client devices using the second budget during the second instance of the first time period.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 8A is a table illustrating an example data structure representative of pacing signal values of days of a week.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
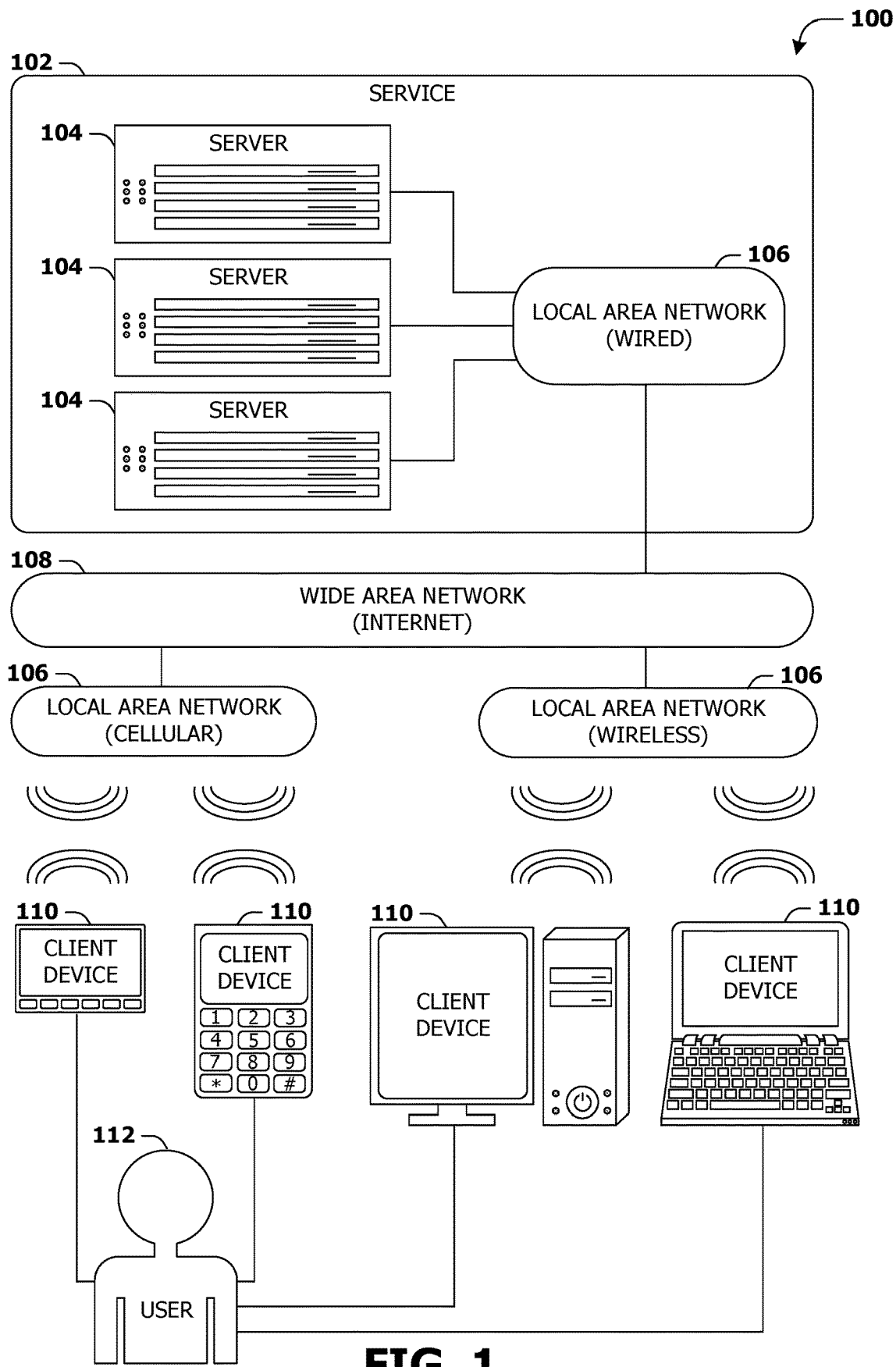
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
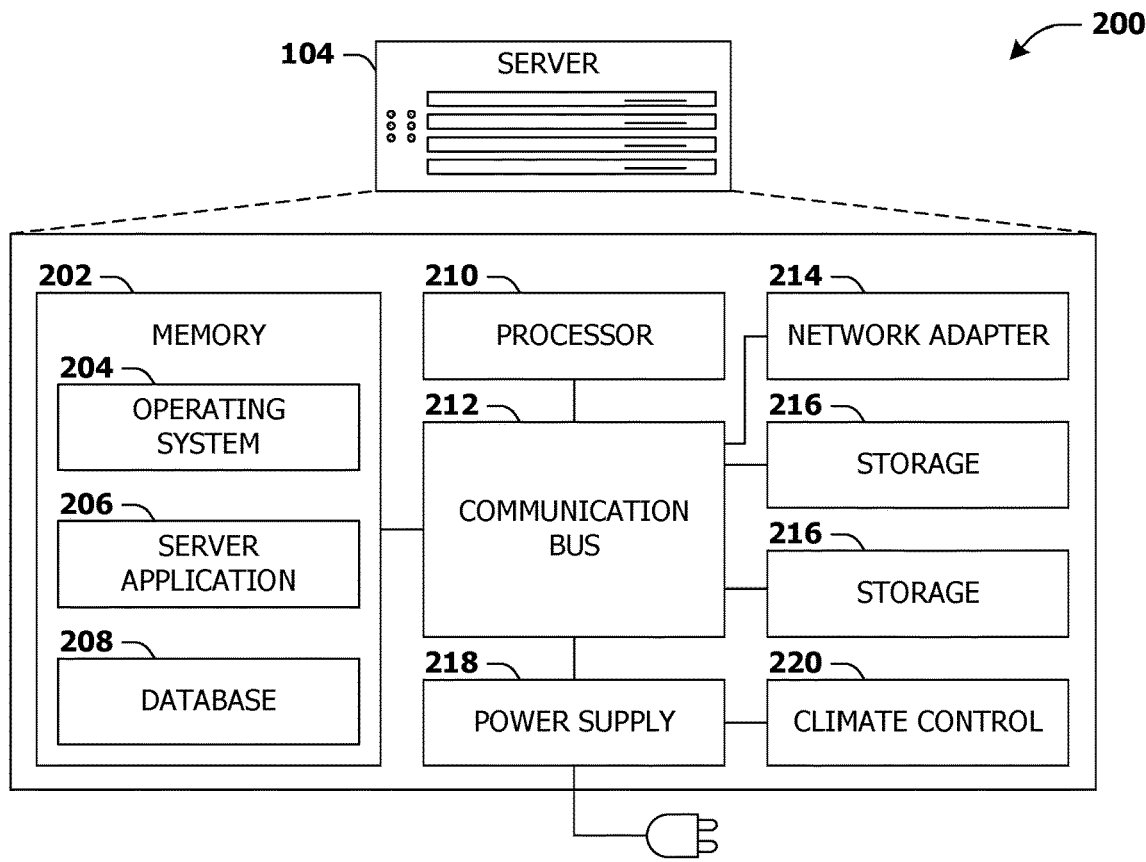
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
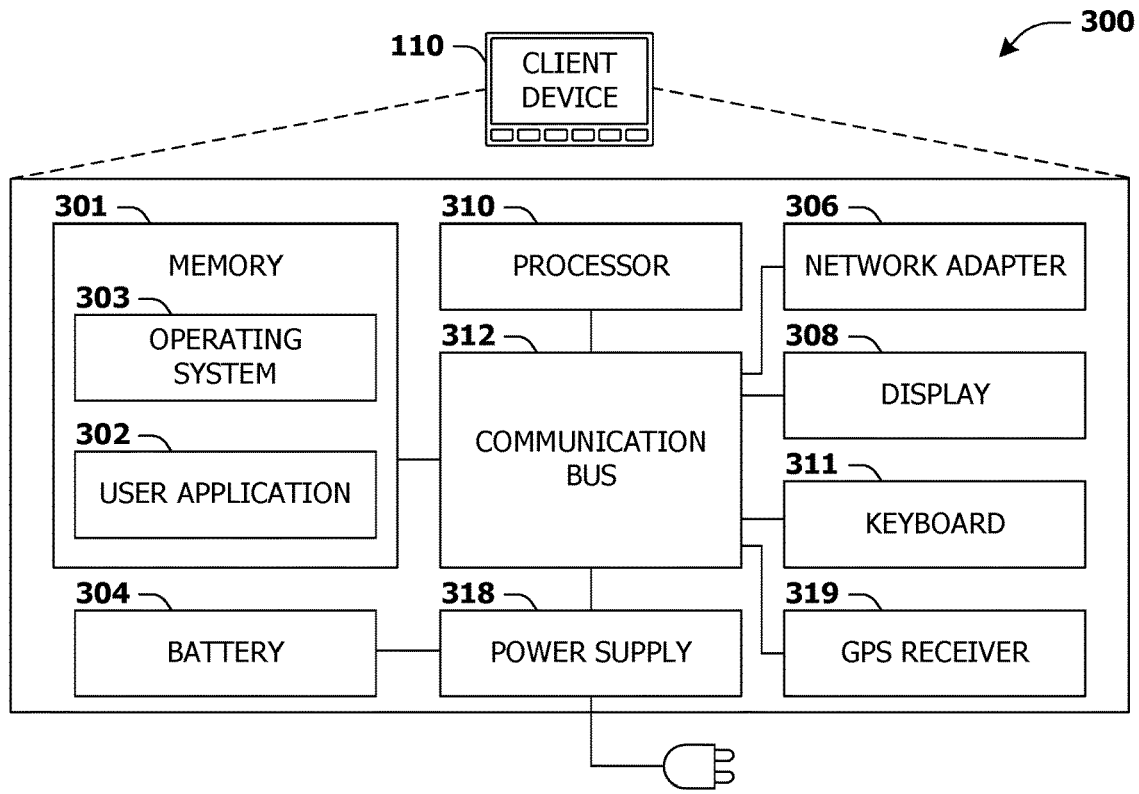
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Figure 4:
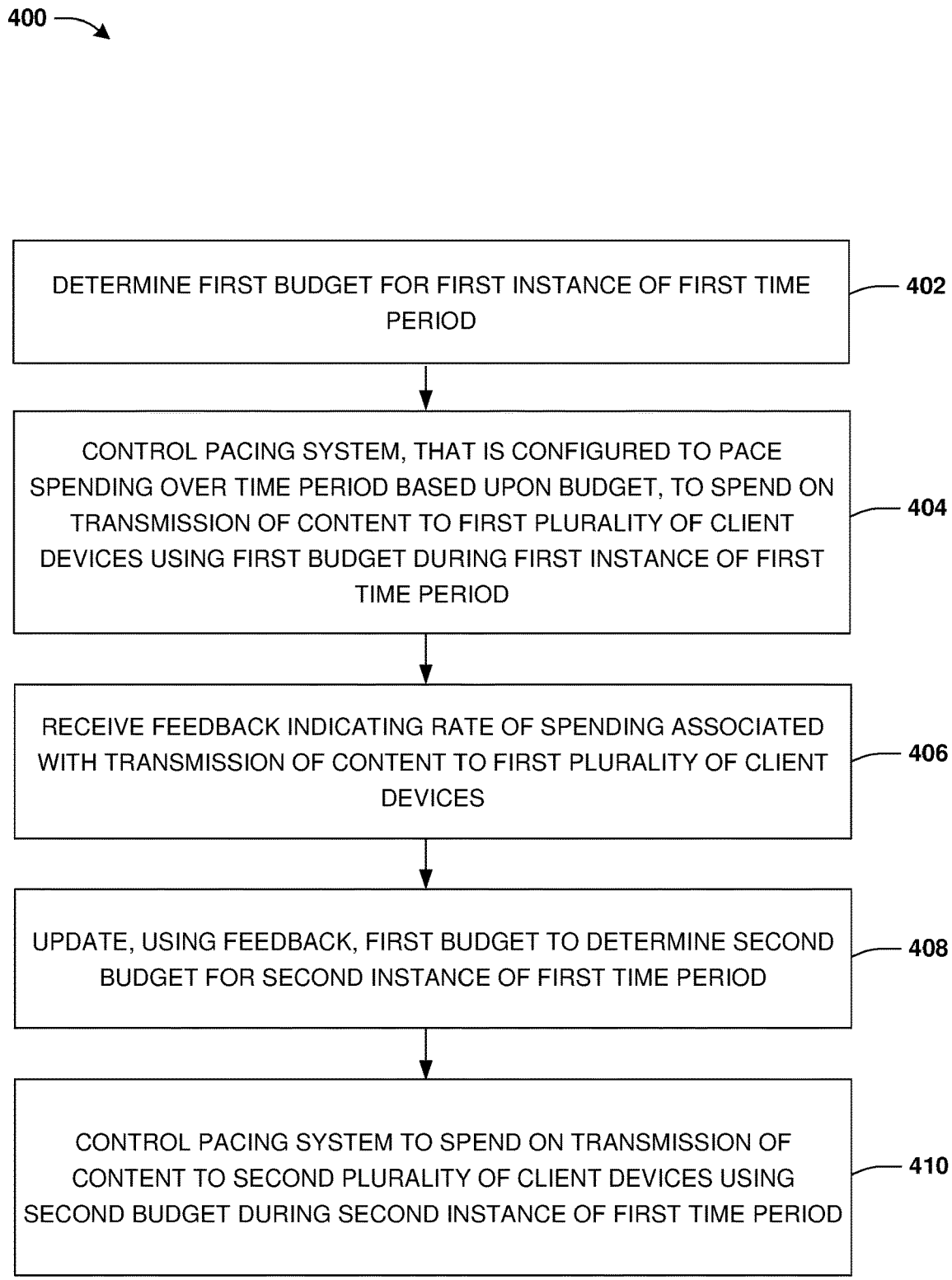
FIG. 4 is a flow chart illustrating an example method for dynamically controlling a budget for distributing content.
Figure 5:
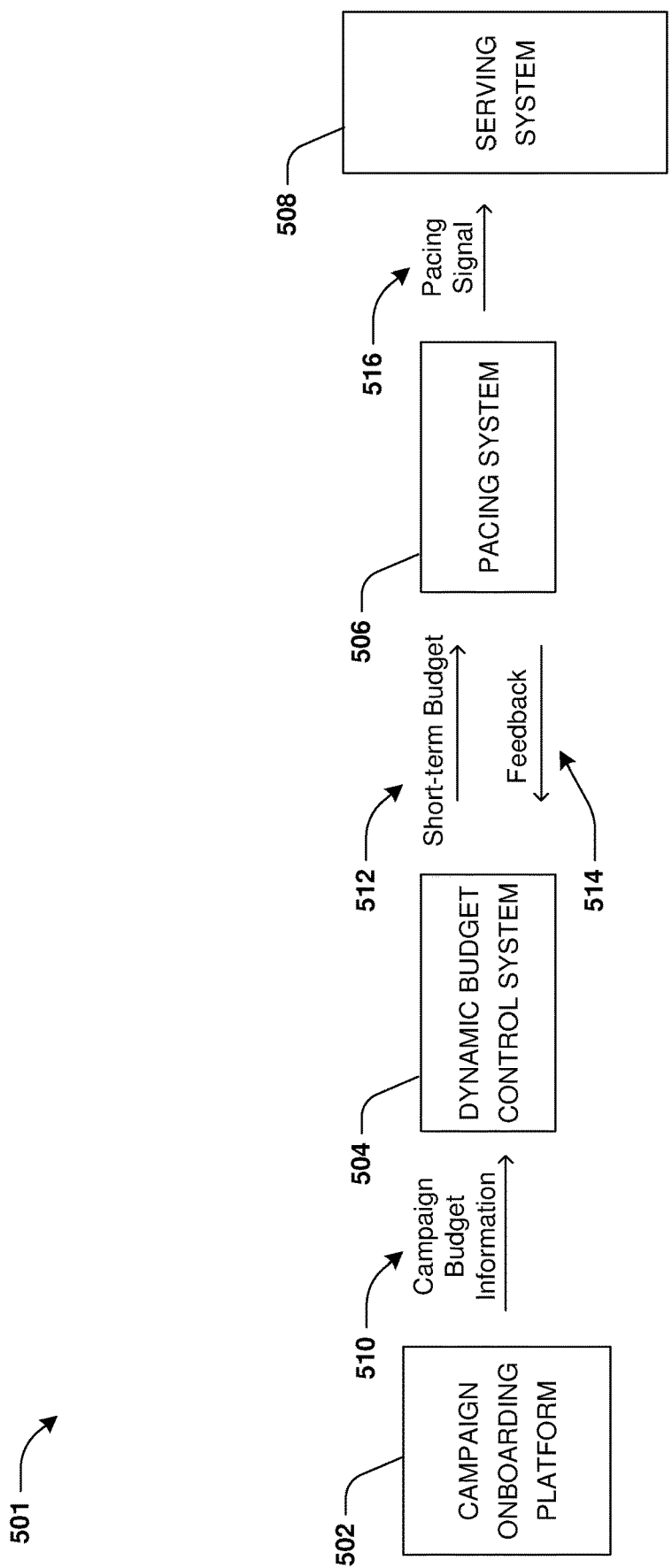
FIG. 5 is a component block diagram illustrating an example system for distributing content.

An embodiment of dynamically controlling a budget for distributing content is illustrated by an example method 400 of FIG. 4, and is further described in conjunction with a content distribution system 501 of FIG. 5. In some examples, the content distribution system 501 comprises a campaign onboarding platform 502, a dynamic budget control system 504, a pacing system 506 and/or a serving system 508. In some examples, the dynamic budget control system 504 feeds a short-term budget 512 to the pacing system 506. The pacing system 506 may be configured to use the short-term budget 512 to pace spending for delivery of content (e.g., advertisements of an advertising campaign) over a time period (e.g., a short-term time period, such as a day).

In some examples, the content distribution system 501 distributes content items, such as advertisements and/or other types of content, to users. In some examples, the content distribution system 501 may provide content items (e.g., news articles, informational articles, videos, advertisements, images, links, etc.) to be presented via pages associated with the content distribution system 501 (e.g., pages providing search engines, email services, news content, communication services, etc.). For example, the pages may be associated with (e.g., accessed using) one or more applications (e.g., web applications, mobile applications, etc.), one or more websites, etc. associated with the content distribution system 501. The content distribution system 501 may provide content items to be presented in (dedicated) locations throughout the pages (e.g., one or more areas of the pages configured for presentation of content items). For example, the content distribution system 501 may select a content item to present to a user, and present the content item at the top of a web page associated with the content distribution system 501 (e.g., within a banner area), at the side of the web page (e.g., within a column), in a pop-up window, overlaying content of the web page, etc. Alternatively and/or additionally, the content distribution system 501 may select a group of content items (e.g., links to at least one of news articles, videos, etc.) and present a list comprising the group of content items. For example, the list may correspond to a list of news articles, and a user interested in a given news article can select a corresponding content item in the list to access the news article.

In some examples, the campaign onboarding platform 502 provides a campaign onboarding interface for display on a first client device of a first entity, such as an advertiser, a company, etc. associated with a first campaign. The first campaign may correspond to an advertising campaign for promoting one or more products, services, etc. associated with the first entity. For example, the first entity may provide one or more campaign content items (e.g., advertisements promoting products and/or services of the first entity) that the content distribution system 501 distributes to users as part of the first campaign. In some examples, campaign budget information 510 for the first campaign (e.g., an amount the first entity is willing to spend in conjunction with the first campaign) is collected by the campaign onboarding platform 502. For example, the campaign budget information 510 may be determined based upon user provided information received from the first client device via the campaign onboarding interface. The campaign budget information 510 may indicate at least one of a short-term budget (e.g., a daily budget) for the first campaign, a total budget for the first campaign, a campaign bid, etc.

In some examples, the dynamic budget control system 504 determines an initial short-term budget for the first campaign based upon the campaign budget information 510. In an example in which the campaign budget information 510 includes a (user-provided) short-term budget (e.g., the short-term budget may be collected from the first entity via the campaign onboarding interface), the initial short-term budget may be set to the short-term budget indicated by the campaign budget information 510. In an example in which the campaign budget information 510 includes a total budget for the first campaign, the initial short-term budget may be determined by combining the total budget with a duration of the first campaign, which may be collected from the first entity using the campaign onboarding platform 502 (e.g., the initial short-term budget may be determined by dividing the total budget of the first campaign by a number of days of the first campaign).

In some embodiments, the dynamic budget control system 504 keeps the short-term budget 512 for the first campaign constant for a monitoring period. In an example, the monitoring period may span a week (i.e., 7 days). Other examples (e.g., 12 hours, 1 day, 5 days, two weeks, one month, etc.) of the monitoring period are within the scope of the present disclosure. In some examples, the monitoring period begins when the first campaign begins. In some examples, the dynamic budget control system 504 sets the short-term budget 512 to the initial short-term budget for the monitoring period (e.g., the short-term budget 512 for the first campaign is equal to the initial short-term budget for the entirety of the monitoring period). Thus, during the monitoring period, the pacing system 506 paces spending for the first campaign based upon the initial short-term budget. In an example, the initial short-term budget is an initial daily budget, and for each day during the monitoring period, the pacing system 506 uses the initial daily budget to pace spending on the first campaign (e.g., the pacing system 506 uses the initial daily budget as a target amount of spend to achieve for each day of the monitoring period).

In some examples, the dynamic budget control system 504 receives feedback 514 indicating a rate of spending associated with the first campaign during the monitoring period and/or an amount of spending associated with the first campaign during the monitoring period. The feedback 514 may be received from the pacing system 506, the serving system 508, and/or other component. In some examples, the dynamic budget control system 504 may compare actual spend (e.g., the amount of spending indicated by the feedback 514) with target spend (e.g., the initial short-term budget for the monitoring period) to update (e.g., adjust, such as increase or decrease) the short-term budget 512. Alternatively and/or additionally, the dynamic budget control system 504 may update the short-term budget 512 based upon the rate of spending indicated by the feedback 514. In some examples, the rate of spending may be determined based upon (and/or may be indicative of) one or more pacing signal values (e.g., pacing signal 516) output by the pacing system 506 for the first campaign. In some examples, the dynamic budget control system 504 comprises a first machine learning model, and employs the first machine learning model in updating the short-term budget 512. For example, the feedback 514 may be processed by the first machine learning model to determine an improved and/or more accurate updated value of the short-term budget 512, and the first machine learning model may output the updated value of the short-term budget 512 to the pacing system 506 for use in a time period (e.g., a short-term time period).

At 402, the dynamic budget control system 504 determines a first budget for a first instance of a first time period. In some examples, the first budget is a first short-term budget (e.g., a first daily budget). In an example, the first time period is a first day (e.g., a specific day of week), such as Sunday, Monday, Tuesday, Wednesday, Thursday, Friday or Saturday. At 404, the dynamic budget control system 504 controls the pacing system 506 to spend on transmission of content to a first plurality of client devices using the first budget during the first instance of the first time period. For example, the dynamic budget control system 504 may control the pacing system 506 (to spend on transmission of content using the first budget during the first instance of the first time period) by transmitting an indication of the first budget to the pacing system 506. Alternatively and/or additionally, the dynamic budget control system 504 may transmit, to the pacing system 506, a first set of instructions instructing the pacing system 506 to use the first budget for the first instance of the first time period. In some examples, in response to receiving the first set of instructions, the pacing system 506 paces spending on the first campaign according to the first budget during the first instance of the first time period. For example, the pacing system 506 may determine a pacing signal 516 based upon the first budget and/or may submit the pacing signal 516 to the serving system 508. In some examples, the serving system 508 runs an auction to determine a winning bid for a content delivery opportunity (e.g., an advertisement opportunity) from among bids submitted by the pacing system 506 and/or other entities. The pacing signal 516 may be associated with the first campaign. In some examples, the pacing signal 516 may be indicative of a probability, which may be used to throttle the campaign. The pacing system 506 and/or the serving system 508 may (e.g., randomly) prevent the first campaign from participating in auctions according to the probability. For example, if the pacing signal 516 is indicative of a probability of 30%, (i) the first campaign (e.g., a bid associated with the first campaign) may participate in about 30% of a plurality of auctions (e.g., auctions during the first instance of the first time period) and/or (ii) the first campaign may not participate in about 70% of the plurality of auctions. Alternatively and/or additionally, the pacing signal 516 may be combined with the campaign bid to determine a usable bid (e.g., updated bid) for participation in the auction (e.g., the pacing signal 516 may be indicative of a multiplicative factor that can be multiplied with the campaign bid to determine the usable bid). If the usable bid (associated with the first campaign) wins the auction (e.g., when the usable bid is greater than other bids of the auction), the content delivery opportunity is allocated to the first campaign and/or the serving system 508 delivers a content item (of the one or more campaign content items associated with the first campaign, for example) to a client device associated with the content delivery opportunity. Embodiments are contemplated in which the auction and/or the delivery of the content item are performed by an entity other than the serving system 508 (e.g., the serving system 508 may submit the usable bid to the entity to perform the auction).

In some examples, the dynamic budget control system 504 determines the first budget (e.g., the first short-term budget) based upon the feedback 514 associated with the monitoring period. The feedback 514 may indicate a rate of spending associated with transmission of content to client devices for the first campaign during the monitoring period. In some examples, the monitoring period comprises a prior instance of the first time period (prior to the first instance of the first time period). Alternatively and/or additionally, the feedback 514 may indicate a rate of spending on the first campaign during the prior instance of the first time period. In an example, the prior instance of the first time period may be the first day of a first week, and the first instance of the time period may be the first day of a second week after the first week. In an example, the prior instance of the first time period is Monday, August 7, and the first instance of the first time period is Monday, August 14. The dynamic budget control system 504 may determine the first budget for the first instance of the first time period (e.g., Monday, August 14) based upon the rate of spending on the first campaign during the prior instance of the first time period (e.g., Monday, August 7). In some examples, the rate of spending may be determined based upon (and/or may be indicative of) one or more pacing signal values (e.g., the pacing signal 516) associated with the first campaign and/or the prior instance of the first time period. In some examples, the one or more pacing signal values are used (by the pacing system 506 and/or the serving system 508, for example) to pace spending for the first campaign during the prior instance of the first time period. Alternatively and/or additionally, the one or more pacing signal values are output by the pacing system 506 for the first campaign during the prior instance of the first time period (e.g., the one or more pacing signal values may comprise a value of the pacing signal 516 for the first campaign during the prior instance of the first time period). In some examples, the feedback 514 is indicative of the one or more pacing signal values, and/or the dynamic budget control system 504 may determine the rate of spending based upon the one or more pacing signal values. In an example, the rate of spending may be equal to a pacing signal value of the one or more pacing signal values. Alternatively and/or additionally, the rate of spending may be determined by combining (e.g., averaging) the one or more pacing signal values.

At 406, the dynamic budget control system 504 may receive second feedback indicating a first value corresponding to a first rate of spending associated with the transmission of content to the first plurality of client devices. The second feedback may be received from the pacing system 506, the serving system 508, and/or other component. The first value may specify a first rate of spending associated with the first campaign during the first instance of the first time period. For example, the first value may be determined based upon (and/or may be indicative of) one or more first pacing signal values (e.g., the pacing signal 516) associated with the first campaign and/or the first instance of the first time period. In some examples, the one or more first pacing signal values are used (by the pacing system 506 and/or the serving system 508, for example) to pace spending for the first campaign during the first instance of the first time period. Alternatively and/or additionally, the one or more first pacing signal values are output by the pacing system 506 for the first campaign during the first instance of the first time period (e.g., the one or more first pacing signal values may comprise a value of the pacing signal 516 for the first campaign during the first instance of the first time period). In some examples, the second feedback is indicative of the one or more first pacing signal values, and/or the dynamic budget control system 504 may determine the first value based upon the one or more first pacing signal values. In an example, the first value may be equal to a pacing signal value of the one or more first pacing signal values. Alternatively and/or additionally, the first value may be determined by combining (e.g., averaging) the one or more first pacing signal values. Embodiments are contemplated in which the first value is indicative of (and/or based upon) an amount (e.g., a monetary amount) spent on the first campaign during the first instance of the first time period (e.g., the first value may indicate a total amount spent on transmitting content, such as the one or more campaign content items, to the first plurality of client devices during the first instance of the first time period, wherein the total amount spent may be determined based upon winning bids, submitted by the pacing system 506 to the serving system 508, for providing the one or more campaign comment items to the first plurality of client devices).

At 408, the dynamic budget control system 504 may use the second feedback to update the first budget to determine a second budget for a second instance of the first time period. For example, the dynamic budget control system 504 may determine the second budget based upon the first value indicated by the second feedback (e.g., the first rate of spending associated with the first instance of the first time period). In an example, the first instance of the first time period may be the first day of the second week, and the second instance of the first time period may be the first day of a third week after the second week. In an example, the first instance of the first time period is Monday, August 14, and the second instance of the first time period is Monday, August 21.

In some examples, the dynamic budget control system 504 uses the first machine learning model to update the first budget and/or determine the second budget. For example, the second feedback (and/or other feedback associated with the first campaign) may be input to the first machine learning model, which may use the second feedback (and/or the other feedback) to determine the second budget.

In some examples, the dynamic control budget system 504 determines an average rate of spending over a first instance of a plurality of time periods. In an example, the plurality of time periods may correspond to a week, where each time period of the plurality of time periods is a day of the week, and/or where the first instance of the plurality of time periods corresponds to the second week (after the first week). Other examples of the plurality of time periods are within the scope of the present disclosure. The first instance of the plurality of time periods may comprise the first instance of the first time period. The average rate of spending may correspond to an average (e.g., at least one of a mean, a median, a mode, etc.) of rates of spending associated with the first campaign over the first instance of the plurality of time periods. For example, the average rate of spending may correspond to an average rate of spending per day (for the first campaign, for example) over the second week. The rates of spending (used to determine the average rate of spending, for example) may comprise the first rate of spending associated with the first instance of the first time period (e.g., Monday of the second week), a second rate of spending associated with a first instance of a second time period of the plurality of time periods (e.g., Tuesday of the second week), a third rate of spending associated with a first instance of a third time period of the plurality of time periods (e.g., Wednesday of the second week), etc.

In some examples, the dynamic control budget system 504 updates the first budget to determine the second budget based upon a comparison of the average rate of spending with the first value (e.g., the first rate of spending associated with the first instance of the first time period). For example, based upon the first value exceeding the average rate of spending, the dynamic control budget system 504 may increase the first budget to determine the second budget. For example, the dynamic control budget system 504 may set the second budget to a value higher than the first budget based upon a determination that the first value exceeds the average rate of spending.

Alternatively and/or additionally, based upon the first value being lower than the average rate of spending, the dynamic control budget system 504 may decrease the first budget to determine the second budget. For example, the dynamic control budget system 504 may set the second budget to a value lower than the first budget based upon a determination that the first value is lower than the average rate of spending.

At 410, the dynamic budget control system 504 controls the pacing system 506 to spend on transmission of content to a second plurality of client devices using the second budget during the second instance of the first time period. For example, the dynamic budget control system 504 may control the pacing system 506 (to spend on transmission of content using the second budget during the second instance of the first time period) by transmitting an indication of the second budget to the pacing system 506. Alternatively and/or additionally, the dynamic budget control system 504 may transmit, to the pacing system 506, a second set of instructions instructing the pacing system 506 to use the second budget for the second instance of the first time period. In some examples, in response to receiving the second set of instructions, the pacing system 506 paces spending on the first campaign according to the second budget during the second instance of the first time period. For example, the pacing system 506 may determine a pacing signal based upon the second budget and/or may submit the pacing signal to the serving system 508 (e.g., the serving system 508 may use the pacing signal to determine a bid for the first campaign and/or throttle the first campaign).

In some examples, the short-term budget 512 may be stored in a first memory of the dynamic budget control system 504. In some examples, in response to determining the first budget, the dynamic budget control system 504 clears the first memory, and after clearing the first memory, the dynamic budget control system 504 stores an indication of the first budget in the first memory. In some examples, in response to determining the second budget, the dynamic budget control system 504 clears the first memory, and after clearing the first memory, the dynamic budget control system 504 stores an indication of the second budget in the first memory. In some examples, the pacing system 506 accesses the first memory to determine a current and/or updated version of the short-term budget 512.

In some examples, the pacing system 506 controls outgoing bids using a pacing signal. The pacing system 506 may maintain and/or update a first pacing signal for the first campaign to regulate spend associated with the first campaign (such that the spend is distributed more uniformly throughout a duration of time). In some examples, the pacing system 506 controls the first pacing signal based upon the short-term budget 512 provided by the dynamic budget control system 504 (e.g., the first pacing signal may be a function of the short-term budget 512, where an increase of the short-term budget 512 may be associated with an increase of the first pacing signal). The pacing system 506 may use the first pacing signal as a probability, and may (e.g., randomly) prevent the first campaign from participating in auctions according to the probability. Alternatively and/or additionally, the pacing system 506 may use the first pacing signal as a multiplicative factor on a bid. Thus, when the first pacing signal is lower than 1, applying the first pacing signal to the bid results in lowering the bid. In some examples, the first pacing signal ranges from at least 0 to at most 1.

In some examples, comparatively lower values of the first pacing signal (associated with the first campaign) may indicate that the first campaign is spending at a comparatively quicker pace (due to increased traffic flow, for example), thus the first campaign is throttled more (via the lower first pacing signal) so as to distribute spend with increased uniformity. Alternatively and/or additionally, comparatively higher values of the first pacing signal) may indicate that the first campaign has relatively fewer opportunities to spend and/or that the first campaign is winning relatively fewer auctions (due to an increase in competitors, for example), thus the first campaign is throttled less (via the higher first pacing signal).

In some examples, the feedback 514 provided to the dynamic budget control system 504 (and/or the second feedback) may be indicative of one or more values of the first pacing signal that were used by the pacing system 506 to regulate spend of the first campaign (e.g., values of the first pacing signal during the monitoring period and/or during the first instance of the first time period, such as during the first day of the first week). In some examples, the dynamic budget control system 504 may determine, based upon one or more pacing signal values indicated by the second feedback, a first short-term pacing signal value associated with the first instance of the first time period. In some examples, the first short-term pacing signal value may correspond to an average daily pacing signal for the first campaign during the first instance of the first time period. For example, the first short-term pacing signal value may correspond to an average (e.g., at least one of a mean, a median, a mode, etc.) of values of the first pacing signal over the first instance of the first time period (e.g., Monday of the first week).

In some embodiments of the present disclosure, the dynamic budget control system 504 may use values of the first pacing signal to predict traffic flow (using the first machine learning model, for example), and may determine the short-term budget 512 based upon the predicted traffic flow (e.g., relatively higher values of the short-term budget 512 for periods of relatively lower predicted traffic flow and/or relatively lower values of the short-term budget 512 for periods of relatively higher predicted traffic flow).

In some examples, the dynamic control budget system 504 determines an average pacing signal over the first instance of the plurality of time periods. The average pacing signal may correspond to an average (e.g., at least one of a mean, a median, a mode, etc.) of values of the first pacing signal over the first instance of the plurality of time periods. For example, the average pacing signal may correspond to an average of values of the first pacing signal over the second week.

In some examples, the dynamic control budget system 504 updates the first budget to determine the second budget (for Monday of the second week, for example) based upon a comparison of the average pacing signal (e.g., average weekly pacing signal) with the first short-term pacing signal value associated with the first budget (that was used by the pacing system 506 for Monday of the first week, for example). For example, based upon the first short-term pacing signal value being lower than the average pacing signal, the dynamic control budget system 504 may increase the first budget to determine the second budget. For example, the dynamic control budget system 504 may set the second budget to a value higher than the first budget based upon a determination that the first short-term pacing signal value is lower than the average pacing signal (which may be reflective of relatively higher traffic flow on Monday of the first week, for example).

Alternatively and/or additionally, based upon the first short-term pacing signal value being higher than the average pacing signal, the dynamic control budget system 504 may decrease the first budget to determine the second budget. For example, the dynamic control budget system 504 may set the second budget to a value lower than the first budget based upon a determination that the first short-term pacing signal value is higher than the average pacing signal (which may be reflective of relatively lower traffic flow on Monday of the first week, for example).

In some examples, the dynamic control budget system 504 may determine budgets (e.g., short-term budgets, such as daily budgets) for each time period of a second instance of the plurality of time periods comprising the first time period. In some examples, the second instance of the plurality of time periods is after the first instance of the plurality of time periods. In an example in which the first instance of the plurality of time periods is the second week, the second instance of the plurality of time periods may be the third week after the second week. In some examples, the dynamic control budget system 504 may determine a daily budget for each day of the third week using one or more of the techniques provided herein with respect to determining the second budget for the first day (e.g., Monday) of the third week.

Figure 6:
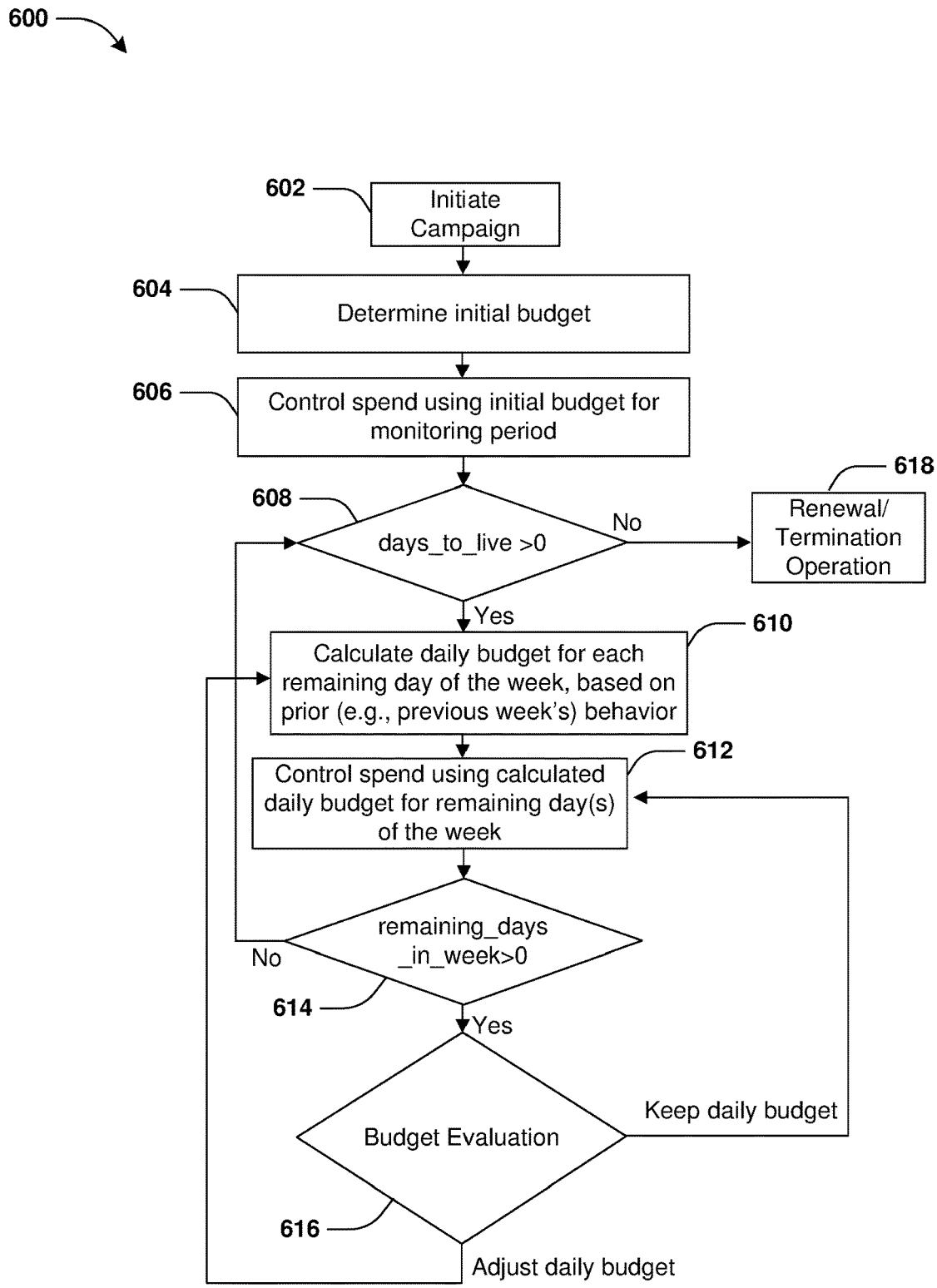
FIG. 6 is a flow chart illustrating an example method for dynamically controlling a budget for distributing content.

FIG. 6 illustrates an example method 600 for dynamically controlling a budget for distributing content, wherein the short-term budget 512 is a daily budget. At 602, a new campaign (e.g., the first campaign) may be initiated. For example, the first campaign may be initiated in response to receiving a request to initiate the first campaign from the first entity. The request may be received (in conjunction with the campaign budget information 510, for example) via the campaign onboarding interface provided by the campaign onboarding platform 502).

At 604, the dynamic budget control system 504 may determine the initial short-term budget (based upon the campaign budget information 510, for example). At 606, the dynamic budget control system 504 may control the pacing system 506 to spend on the first campaign according to the initial short-term budget for the monitoring period. For example, the dynamic budget control system 504 may set the short-term budget 512 to the initial short-term budget for the monitoring period. In some examples, the monitoring period is a duration of at least a week to allow sufficient feedback to be collected for use in updating and/or adjusting the short-term budget 512.

At 608, the dynamic budget control system 504 determines a first parameter (e.g., "days_to_live") and determines whether the first parameter is higher than zero. For example, the first parameter may correspond to a number of days until the first campaign is over, which may be based upon the duration of the first campaign. In some examples, one or more campaign renewal/termination operations may be performed, at 618, in response to the first parameter reaching zero. The one or more campaign renewal/termination operations may comprise sending a message to the first entity, wherein the message comprises an interface enabling the user to submit a request to renew the first campaign. The first campaign may be renewed in response to receiving the request to renew the first campaign (and the first parameter based upon the renewal, for example). In some examples, the dynamic budget control system 504 may perform act 610 of FIG. 6 (discussed below) in response to determining that the first parameter is higher than zero. Alternatively and/or additionally, the one or more campaign renewal/termination operations may comprise terminating the first campaign.

At 610, the dynamic budget control system 504 calculates a daily budget (e.g., the short-term budget 512) for each remaining day of a week, based upon behavior (e.g., spending behavior) associated with a previous week. In some embodiments, the monitoring period comprises the first week, wherein the dynamic budget control system 504 performs act 610 to determine a daily budget for each day of the second week based upon feedback associated with the first week. In an example, in act 610, the dynamic budget control system 504 may determine a list of daily budgets for the second week. The list of daily budgets may comprise one or more budgets comprising (i) a first daily budget for Monday of the second week (e.g., the first daily budget may be based upon feedback associated with spending behavior for the first campaign during Monday of the first week and/or other days of the first week), (ii) a second daily budget for Tuesday of the second week (e.g., the second daily budget may be based upon feedback associated with spending behavior for the first campaign during Tuesday of the first week and/or other days of the first week), (iii) a third daily budget for Wednesday of the second week (e.g., the third daily budget may be based upon feedback associated with spending behavior for the first campaign during Wednesday of the first week and/or other days of the first week), (iv) a fourth daily budget for Thursday of the second week (e.g., the fourth daily budget may be based upon feedback associated with spending behavior for the first campaign during Thursday of the first week and/or other days of the first week), (v) a fifth daily budget for Friday of the second week (e.g., the fifth daily budget may be based upon feedback associated with spending behavior for the first campaign during Friday of the first week and/or other days of the first week), (vi) a sixth daily budget for Saturday of the second week (e.g., the sixth daily budget may be based upon feedback associated with spending behavior for the first campaign during Saturday of the first week and/or other days of the first week), and/or (vii) a seventh daily budget for Sunday of the second week (e.g., the seventh daily budget may be based upon feedback associated with spending behavior for the first campaign during Sunday of the first week and/or other days of the first week).

At 612, the dynamic budget control system 504 may use the list of daily budgets to control the pacing system 506 to spend on the first campaign for one or more remaining days of the second week. For example, the dynamic budget control system 504 may at least one of (i) control the pacing system 506 to spend on the first campaign using the first daily budget on Monday of the second week (e.g., the dynamic budget control system 504 may set the short-term budget 512 to the first daily budget for Monday of the second week), (ii) control the pacing system 506 to spend on the first campaign using the second daily budget on Tuesday of the second week (e.g., the dynamic budget control system 504 may set the short-term budget 512 to the second daily budget for Tuesday of the second week), etc.

At 614, the dynamic budget control system 504 determines a second parameter (e.g., "remaining_days_in_week") and determines whether the second parameter is higher than zero. For example, the second parameter may correspond to a number of remaining days in the second week. In some examples, the dynamic budget control system 504 may perform a second iteration of act 608 in response to the second parameter reaching zero (which may indicate that there are no remaining days in the second week and/or may prompt the dynamic budget control system 504 to determine updated daily budgets for the third week following the second week, for example). In some examples, the dynamic budget control system 504 may perform act 616 of FIG. 6 (discussed below) in response to determining that the second parameter is higher than zero (which may indicate that there are one or more remaining days in the second week for which the dynamic budget control system 504 determined the set of daily budgets, for example).

At 616, the dynamic budget control system 504 may perform a budget evaluation to determine whether to adjust the list of daily budgets. In some examples, the budget evaluation is performed by (i) determining an amount of spending over at least some of the second week, (ii) determining a budgetary spending range based upon the list of daily budgets and/or a current time, and/or (iii) comparing the amount of spending with the budgetary spending range (so as to determine whether the content distribution system 501 is overspending, such as in the case where the amount of spending is higher than the maximum of the budgetary spending range, or underspending, such as in the case where the amount of spending is lower than the minimum of the budgetary spending range). In some examples, the dynamic budget control system 504 may determine to keep the list of daily budgets (without adjusting the list of daily budgets, for example) based upon a determination that the amount of spending is within the budgetary spending range. In some examples, the dynamic budget control system 504 may determine to adjust the list of daily budgets based upon a determination that the amount of spending is outside the budgetary spending range.

In some examples, the dynamic budget control system 504 may perform a second iteration of act 612 in response to determining (via the budget evaluation, for example) to keep the list of daily budgets. For example, the dynamic budget control system 504 may use the list of daily budgets to control the pacing system 506 to spend on the first campaign for one or more remaining days of the second week.

Alternatively and/or additionally, the dynamic budget control system 504 may perform a second iteration of act 610 to adjust the list of daily budgets in response to determining to adjust the list of daily budgets. For example, the dynamic budget control system 504 may calculate (e.g., recalculate) one or more daily budgets for one or more remaining days of the second week, and generate an adjusted list of daily budgets including the (e.g., recalculated) one or more daily budgets. The one or more daily budgets may be determined based upon a difference between the budgetary spending range and the amount of spending (thus far in the second week, for example). In an example, the dynamic budget control system 504 may determine (via the budget evaluation, for example) that the first campaign overspent the budgetary spending range by a first amount as of Friday of the second week, and/or may generate the adjusted list of daily budgets to include (i) a sixth adjusted daily budget for Saturday of the second week (e.g., the sixth adjusted daily budget may be lower than the sixth budget of the list of daily budgets to compensate for the first amount overspent by the first campaign), and/or (ii) a seventh adjusted daily budget for Sunday of the second week (e.g., the sixth adjusted daily budget may be lower than the seventh budget of the list of daily budgets to compensate for the first amount overspent by the first campaign).

In some examples, the budget evaluation of act 616 may be performed periodically, such as one or more times per day. Performing the budget evaluation of act 616 enables the content distribution system 501 to dynamically and/or quickly respond to changing conditions (e.g., unexpected changes in traffic flow), such as by way of making automatically adjusting the list of daily budgets in response to overspending and/or underspending.

Figure 7:
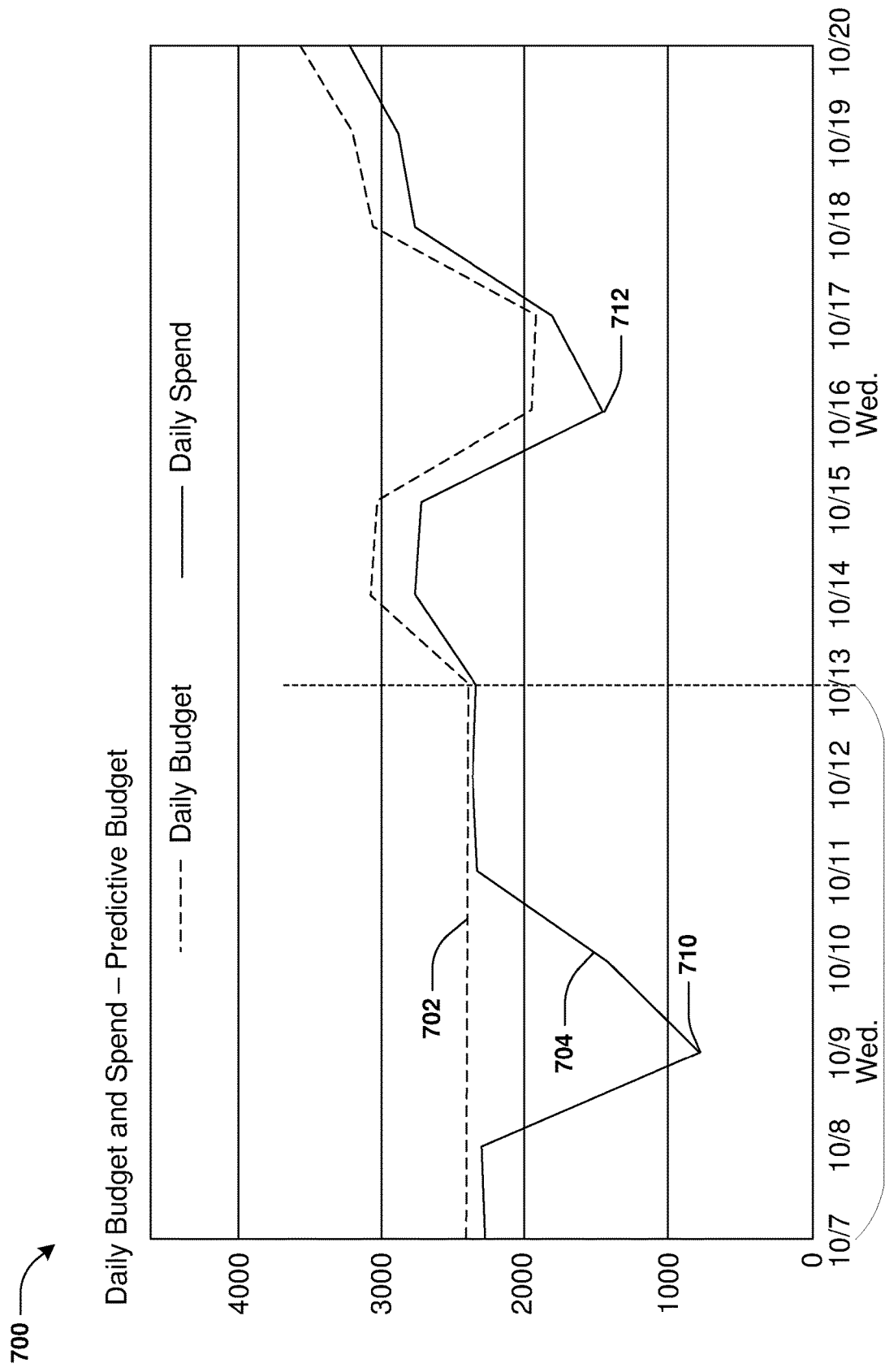
FIG. 7 is a chart representative of a daily budget curve and a daily spend curve for a campaign under the influence of a dynamic budget control system.

FIG. 7 illustrates a chart 700 representative of a daily budget curve 702 and a daily spend curve 704 resulting from an example implementation of the example method 400 of FIG. 4, the content distribution system 501 of FIG. 5 and/or the example method 600 of FIG. 6. In some examples, the daily budget curve 702 is representative of a daily budget (e.g., the short-term budget 712) for each day from October 7 to October 20. In some examples, the daily budget is constant during the monitoring period (shown with reference number 706 in FIG. 7). Thus, for each day of the monitoring period, the (same) daily budget may be input to and/or used by the pacing system 506 for spending on the first campaign. A dip 710 in spending may be apparent on Wednesday, October 9 during the monitoring period 706. Feedback collected in the monitoring period 706 may be used to determine daily budgets of days in a time period (e.g., from October 14 to October 20) after the monitoring period 706. In accordance with some embodiments, the dynamic budget control system 504 may learn (using the first machine learning model, for example), based upon the spending dip 710, to (i) reduce the daily budget for the following Wednesday, October 16, and/or (ii) increase the daily budget for other days of the following week after the monitoring period to compensate for the reduced spending on Wednesday, October 16.

A first budget determination function (which may be referred to as a ratio-based ease of spend function) is provided in accordance with some embodiments of the present disclosure. In some examples, the dynamic budget control system 504 may perform the first budget determination function to generate the list of daily budgets (at the beginning of each respective week during the lifetime of the first campaign, for example). The first budget determination function may comprise one, some, or all of the following acts: (i) compute an average daily budget (unless the average daily budget is already explicitly indicated by the first entity, in which case the average daily budget may not need to be computed) according to $$\text{average\_daily\_budget} = \frac{\text{total\_budget}}{\text{num\_days\_in\_period}}, \quad \text{(ii)}$$

for the monitoring period (e.g., the initial 7 days of the first campaign), run the pacing system 506 with daily_budget=average_daily_budget, (iii) at the beginning of week $w_j$, where j>1, compute weekly_average_$ps_{j-1}$, wherein weekly_average_$ps_{j-1}$ corresponds to an average weekly pacing signal (ps) for week $w_{j-1}$, (iv) for each day of the week j, compute daily_average_ps, wherein daily_average_ps corresponds to an average daily pacing signal for a day (e.g., the average daily pacing signal may correspond to an average value of a plurality of pacing signal values used for the first campaign during the day, such as where a pacing signal provided by the pacing system 506 for the first campaign is updated and/or modified periodically throughout the day, such as once per minute or at a different rate, to determine values of the plurality of pacing signal values) (v) for each day i of the week j, compute weekly_to_daily_ps_ratio$_i$=weekly_average_ps$_{j-1}$/daily_average_ps$_{i-7}$ and/or initial_budget$_i$=daily_budget$_{i-7}$* weekly_to_daily_ps_ratio$_i$, (vi) compute a normalization factor for the week (e.g., the whole week) according to $$\text{normalization\_factor} = \frac{\sum_{i=today}^{today+num\_week\_days-1} \text{initial\_budget}_i}{\text{num\_week\_days} * \text{average\_daily\_budget}}$$

where num_week_days=min (end_date−today, 7), and end_date is the last date that the first campaign will be active (as defined by the first entity, for example), and/or (vii) for each day of the week i compute $$\text{daily\_budget}_i = \frac{\text{initial\_budget}_i}{\text{normalization\_factor}}.$$

A first budget reduction function is provided in accordance with some embodiments of the present disclosure. In some examples, the dynamic budget control system 504 may perform the first budget reduction function to adjust (e.g., reduce) one or more budgets of one or more remaining days of a current week (based upon the budget evaluation of act 616 producing an overspend alert indicating that the first campaign overspent thus far in the current week, for example). Alternatively and/or additionally, the first budget reduction function may be performed in response to a reduction (by the first entity, for example) to a campaign budget (e.g., the total budget) for the first campaign. For example, the first entity may change the campaign budget for the first campaign from a first campaign budget to a second campaign budget, wherein the second campaign budget is less than the first campaign budget. The first budget reduction function may comprise one, some, or all of the following acts: (i) compute remaining_days_to_live=end_date−today, (ii) recompute average daily budget according to $$\text{average\_daily\_budget} = \frac{\text{new\_total\_budget} - \text{sum\_spend\_until\_yesterday}}{\text{remaining\_days\_to\_live}},$$

wherein new_total_budget may correspond to a remaining budget for the first campaign for a remaining part of the current week (e.g., the remaining budget may be based upon an amount by which the first campaign overspent) and/or the second campaign budget, (iii) compute a normalization factor for a first partial week (e.g., remaining days of the week including today) according to $$\text{normalization\_factor} = \frac{\sum_{i=today}^{today+num\_week\_days-1} \text{initial\_budget}_i}{\text{num\_week\_days} * \text{average\_daily\_budget}}$$

where num_week_days is the number of days remaining in the week including today for the first partial week, and/or (vi) for each day of the first partial week, compute $$\text{daily\_budget}_i = \frac{\text{initial\_budget}_i}{\text{normalization\_factor}}.$$

A first budget increase function is provided in accordance with some embodiments of the present disclosure. In some examples, the dynamic budget control system 504 may perform the first budget increase function to adjust (e.g., increase) one or more budgets of one or more remaining days of a current week (based upon the budget evaluation of act 616 producing an underspend alert indicating that the first campaign underspent thus far in the current week, for example). Alternatively and/or additionally, the first budget increase function may be performed in response to an increase (by the first entity, for example) to the campaign budget (e.g., the total budget) for the first campaign. For example, the first entity may change the campaign budget for the first campaign from the first campaign budget to the second campaign budget, wherein the second campaign budget is greater than the first campaign budget. The first budget increase function may comprise one, some, or all of the acts of the first budget reduction function. In some examples, in the first budget increase function, new_total_budget (discussed herein with respect to the first budget reduction function) may be based upon information comprising the increase to the campaign budget, an amount of spend thus far in the current week, unspent budget, and/or one or more other values (e.g., new_total_budget may correspond to a combination, such as a sum, of the increase to the campaign budget, the amount of spend thus far in the current week, the unspent budget and/or one or more other values).

A second budget determination function (which may be referred to as a gradient descent budget determination function) is provided in accordance with some embodiments of the present disclosure. In some examples, the dynamic budget control system 504 may perform the second budget determination function to generate the list of daily budgets (at the beginning of each respective week during the lifetime of the first campaign, for example). The second budget determination function may comprise one, some, or all of the following acts: (i) compute an average daily budget (unless the average daily budget is already explicitly indicated by the first entity, in which case the average daily budget may not need to be computed) according to $$\text{average\_daily\_budget} = \frac{\text{total\_budget}}{\text{num\_days\_in\_period}}, \quad \text{(ii)}$$

for the monitoring period (e.g., the initial 7 days of the first campaign), run the pacing system 506 with daily_budget=average_daily_budget, (iii) at the beginning of week w$_j$, where j>1, compute weekly_average_ps$_{j-1}$, (iv) for each day d from week w$_{j-1}$, compute: (A) an error: error$_d$=daily_ps$_d$−weekly_average_ps$_{j-1}$, (B) the derivative of a sigmoid function: dvt$_d$=error$_d$·daily_ps$_d$·(1−daily_ps$_d$), and/or (C) a gradient: gradient$_d$=daily_budget$_d$·dvt$_d$, (v) for each day d from week j compute the initial budget according to $$\text{initial\_budget}_d = \text{daily\_budget}_d - \text{step\_size} \cdot \text{gradient}_d, \quad \text{(vi)}$$

compute the normalization factor according to $$n\_factor = \frac{\sum_d initial\_budget_d}{\sum_d daily\_budget_d}$$

and/or (vii) calculate the new budget for (e.g., each) day d in week $w_j$ according to $$new\_budget_d = \frac{initial\_budget_d}{n\_factor},$$

wherein daily_budget$_d$ may refer to the daily budget in week $w_{j-1}$, while new_budget$_d$ may be the daily budget for week $w_j$. In an example, week $w_{j-1}$ may correspond to the first week (e.g., the monitoring period) and week $w_j$ may correspond to the second week.

In some examples, the dynamic budget control system 504 may determine whether to use the first budget determination function or the second budget determination function using a second machine learning model. In some examples, the second machine learning model may analyze historical spend amounts of the first campaign (and/or other campaigns) during weeks with budgets determined using the first budget determination function and weeks with budgets determined using the second budget determination function, and may learn patterns based upon the historical spend amounts, which may aid the second machine learning model in selecting the optimal function to use for determining daily budgets for a week.

Figure 8B:
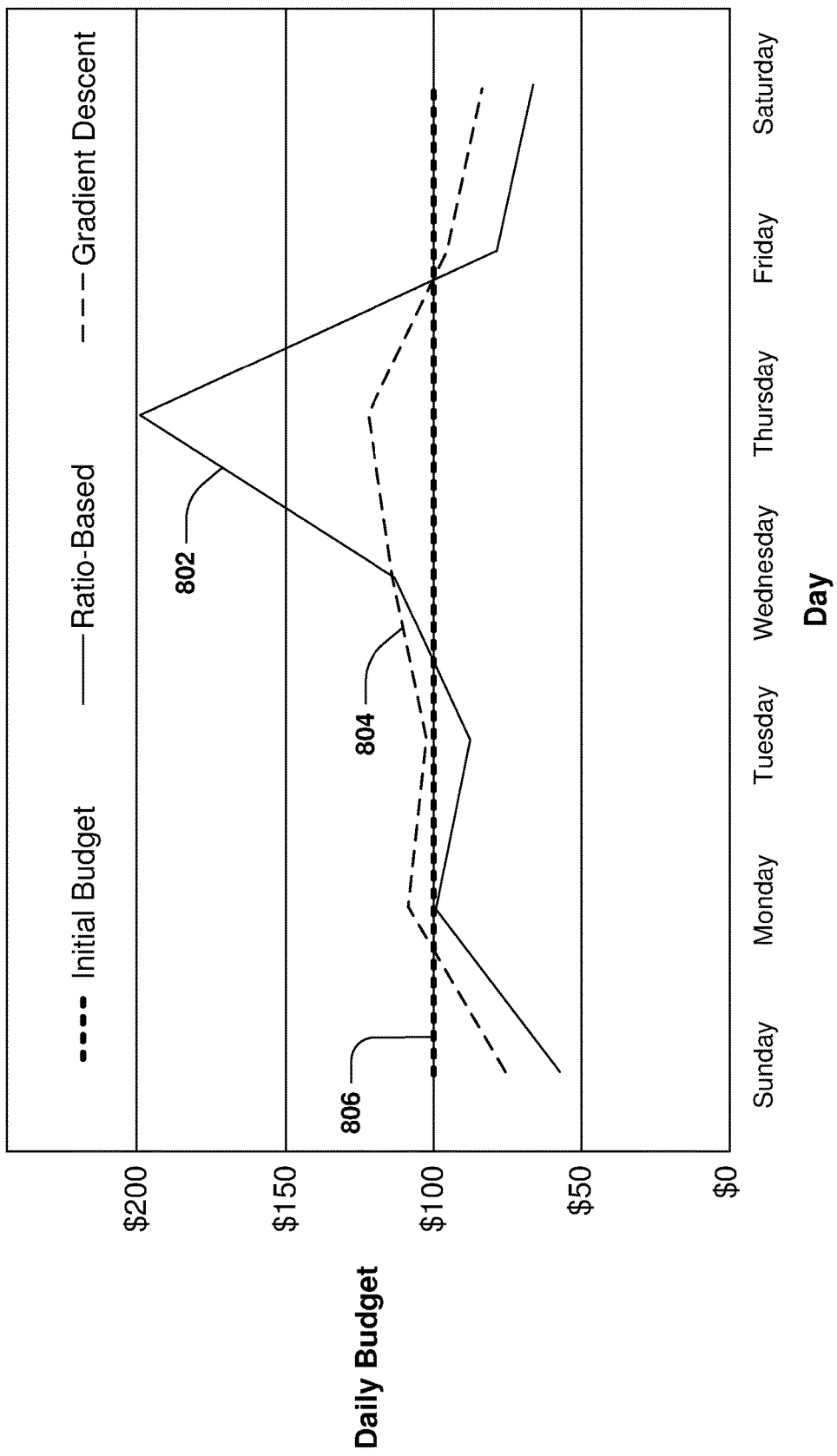
FIG. 8B is a table illustrating an example data structure representative of a first function curve, a second function curve, and/or a predefined daily budget.

FIGS. 8A-8B provide an example scenario associated with the first campaign. FIG. 8A illustrates a data structure 800 representative of pacing signal values (e.g., values of the first pacing signal for the first campaign) for the first week. Each pacing signal value in the data structure 800 may be an average daily pacing signal for a respective day of the first week (e.g., the pacing signal value may be determined using one or more of the techniques provided herein with respect to determining the first short-term pacing signal value). An average weekly pacing signal of the first week (e.g., a mean of the pacing signal values of the data structure 800) may be determined to be about 0.46. It may be apparent that weekend days Sunday and Saturday (and to a lesser extent Friday) have a relatively higher pacing signal value, which may be indicative of higher than average difficulty to spend respective daily budgets. Thus, the dynamic budget control system 504 may reduce daily budgets allocated for Saturday and Sunday of the second week as compared with (previous) daily budgets allocated for Saturday and Sunday of the first week. Alternatively and/or additionally, the dynamic budget control system 504 may increase a daily budget allocated for Thursday of the second week as compared with (previous) daily budgets allocated for Thursday of the first week based upon Thursday being lower than the average weekly pacing signal (by at least a threshold difference, for example).

FIG. 8B illustrates a data structure 850 representative of a first function curve 802 associated with the first budget determination function, a second function curve 804 associated with the second budget determination function, and/or a predefined daily budget 806 (which may be indicated by and/or determined based upon the campaign budget information 510, for example). The first function curve 802 may correspond to a set of daily budget values (e.g., the list of daily budgets) determined (by the dynamic budget control system 504 for the second week, for example) using the first budget determination function. The second function curve 804 may correspond to a set of daily budget values (e.g., the list of daily budgets) determined (by the dynamic budget control system 504 for the second week, for example) using the second budget determination function. For example, the first function curve 802 and/or the second function curve 804 may be generated (by the dynamic budget control system 504 for the second week, for example) based upon the pacing signal values of the data structure 800 in FIG. 8A.

In some of the examples shown in and/or described with respect to FIGS. 6-8B, the dynamic budget control system 504 updates the short-term budget 512 according to a time period duration of one day and/or a cycle duration of one week (i.e., seven days). Any duration of the time period duration and/or any duration of the cycle duration are within the scope of the present disclosure. The time period duration may correspond to a duration of each time period of one, some and/or all of the plurality of time periods. The cycle duration may correspond to a duration of the plurality of time periods (e.g., a quantity of time periods of the plurality of time periods).

In an example in which the time period duration is one day and/or the cycle duration is one week, at least one of: (i) each of the plurality of time periods may correspond to a day of the week, (ii) the first instance of the plurality of time periods comprises Monday of the first week, Tuesday of the first week, Wednesday of the first week, Thursday of the first week, Friday of the first week, Saturday of the first week and/or Sunday of the first week, (iii) the second instance of the plurality of time periods comprises Monday of the second week after the first week, Tuesday of the second week, Wednesday of the second week, Thursday of the second week, Friday of the second week, Saturday of the second week and/or Sunday of the second week, etc.

In an example in which the time period duration is one day and/or the cycle duration is ten days, at least one of: (i) each of the plurality of time periods may correspond to a day of a set of 10 days (e.g., a set of 10 consecutive days), (ii) the first instance of the plurality of time periods comprises a first set of 10 days (e.g., a first set of 10 consecutive days), (iii) the second instance of the plurality of time periods comprises a second set of 10 days (e.g., a second set of 10 consecutive days directly following the first set of 10 days), etc.

One, some and/or all machine learning models of the present disclosure (e.g., the first machine learning model and/or the second machine learning model) may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

In some examples, subsequent to using the first machine learning model to determine the first budget (e.g., the first short-term budget) for the first instance of the first time period, the first machine learning model may be updated to generate an updated version of the first machine learning model based upon performance feedback received from the pacing system 506, the serving system 508, and/or other component. The performance feedback may be indicative of aspects of the first campaign when the first budget is used to control spend of the first campaign. For example, the performance feedback may be indicative of (i) whether the first campaign overspent or underspent during the first instance of the first time period, (ii) an amount by which the first campaign overspent or underspent during the first instance of the first time period, (iii) a measure of impressions and/or clicks of the one or more campaign content items of the first campaign during the first instance of the first time period, and/or (iv) one or more other aspects. In some examples, the first machine learning model may be updated (e.g., trained) by updating trainable parameters of the first machine learning model, using the performance feedback, to generate the updated version of the first machine learning model. In some examples, the updated version of the first machine learning model may be used to (more accurately, for example) determine the second budget (e.g., a second short-term budget for the second instance of the first time period) and/or other budgets for the first campaign and/or other campaigns. For example, act 408 of FIG. 4 may be performed using the updated version of the first machine learning model. In this way, a closed-loop process is implemented allowing usage of feedback (e.g., the performance feedback) to tailor the first machine learning model and/or continuously and/or periodically update the first machine learning model used to determine and/or update budgets used to control the pacing system 506, thereby improving (e.g., continuously and/or periodically improving over time) a quality and/or accuracy of budget determination, budget management, and/or selection and/or presentation of content items for a device. Closed-loop control may reduce errors and produce more efficient operation of a computer system which implements the first machine learning model. The reduction of errors and/or the efficient operation of the computer system may improve operational stability and/or predictability of operation. Accordingly, using processing circuitry to implement closed-loop control described herein may improve operation of underlying hardware of the computer system.

In some systems, budgets that aren't depleted in a given day may be lost (e.g., unspent) and/or may be distributed naively in remaining days of a campaign. Implementation of at least some of the disclosed subject matter may lead to benefits including, but not limited to, minimizing lost content delivery opportunities for the first campaign (such as by distributing content delivery opportunities effectively), increasing a return-on-investment (ROI) of the first entity (e.g., an advertiser) by allowing the first campaign to utilize more and/or higher quality content delivery opportunities (without needing to increase the campaign budget of the first campaign, for example), reducing a need for manual budget management (e.g., marketplace analysis) by the first entity, etc. For example, the techniques of the present disclosure may be used to automatically (and/or without manual intervention) manage spending of the first campaign.

In some examples, the dynamic budget control system 504 comprises a data storage and retrieval system for the first memory (e.g., computer memory) of the dynamic budget control system 504. The data storage and retrieval system may comprise means for configuring the first memory according to a logical table. The logical table may include a plurality of logical rows, wherein each of the plurality of logical rows includes an object identification number (OID) to identify each of the plurality of logical rows, and/or wherein each of the plurality of logical rows corresponds to a record of information. The logical table may include a plurality of logical columns intersecting the plurality of logical rows to define a plurality of logical cells, each wherein each of the plurality of logical columns include an OID to identify each of the logical columns. The data storage and retrieval system may comprise means for indexing data stored in said table. In some examples, each logical cell of one, some and/or all of the plurality of logical cells stores a current budget (e.g., a short-term budget) to use for a campaign (e.g., the first campaign, a second campaign, etc.). In some examples, in response to determining the short-term budget 512, the short-term budget 512 may be stored in a first logical cell of the plurality of logical cells. In some examples, in response to determining the first budget, the data storage and retrieval system clears the first logical cell, and after clearing the first logical cell, the data storage and retrieval system stores the first budget in the first logical cell.

In some examples, a second memory of the content distribution system 501 comprises a quarantine sector, a non-quarantine sector and/or a boot sector, wherein the quarantine sector may be isolated from (e.g., physically isolated from) the non-quarantine sector and/or the boot sector. In some examples, code in the quarantine sector may be prevented from performing write actions on other memory sectors, such as the non-quarantine sector and/or the boot sector. In some examples, in response to the content distribution system 501 receiving an electronic communication, the electronic communication is stored in the quarantine sector of the second memory. In some examples, the electronic communication may comprise a request for content from a client device and/or an advertisement server. In some examples, the content distribution system 501 extracts (via file parsing, for example) a malicious code from the electronic communication to create a sanitized electronic communication. The extraction of the malicious code may comprise (i) scanning the communication for an identified beginning malicious code marker, (ii) flagging each scanned byte between the beginning marker and a successive end malicious code marker, (iii) continuing scanning until no further beginning malicious code marker is found, and/or (iv) creating a new data file by sequentially copying non-flagged data bytes (e.g., all non-flagged data bytes) into a new file that forms a sanitized communication file. In some examples, the content distribution system 501 transfers the sanitized electronic communication to the non-quarantine sector of the second memory. In some examples, the content distribution system 501 deletes data remaining in the quarantine sector (e.g., the content distribution system 501 deletes all data remaining in the quarantine sector).

In some examples, adaptive monitoring of traffic data through a network appliance connected between computing devices (e.g., the serving system 508 and a second client device associated with a content delivery opportunity) is performed. In some examples, the network appliance and/or the content distribution system 501 collect traffic data relating to the network traffic passing through the network appliance, the traffic data comprising network delay, packet loss, and/or jitter. In some examples, the network appliance and/or the content distribution system 501 compare at least one of the collected traffic data to a predefined threshold. In some examples, the network appliance and/or the content distribution system 501 perform one or more acts when the collected traffic data is greater than the predefined threshold. In some examples, the one or more acts comprise collecting additional traffic data relating to the network traffic. In some examples, the additional traffic data comprises protocol data. In some examples, the additional traffic data is exported to a traffic collector to analyze the additional traffic data to determine one or more network issues (e.g., a malfunctioning network component, a source of interference, etc.) and/or facilitate performance of maintenance operations to remedy the one or more network issues. Alternatively and/or additionally, the one or more acts may comprise blocking transmission of a first content item (e.g., a content item associated with a winning bid of an auction performed for the content delivery opportunity) to the second client device to ease traffic load through the network appliance. In some examples, the first content item is transmitted to the second client device when the collected traffic data is less than the predefined threshold.

In some examples, the serving system 508 transmits the first content item to the second client device over one or more cryptographic communications between the serving system 508 and the second client device. In some examples, the serving system 508 receives a plaintext word signal. The serving system 508 transforms the plaintext word signal to one or more message block word signals $M_A$. In some examples, the serving system 508 encodes each of the message block word signals $M_A$ to produce a ciphertext word signal CA. In some examples, CA=MAe (mod n). In some examples, (i) CA is a number representative of an encoded form of message word $M_A$, (ii) $M_A$ corresponds to a number representative of a message, (iii) $0 \leq M_A \leq n-1$, (iv) n is a composite number of the form n=p*q, (v) p and q are prime numbers, and/or (vi) e is a number relatively prime to (p−1)*(q−1). The serving system 508 may transmit the ciphertext word signal CA to the second client device over a communication channel. The ciphertext word signal CA may be indicative of at least a portion of the first content item.

In some examples, a third memory of the second client device comprises a quarantine sector, a non-quarantine sector and/or a boot sector, wherein the quarantine sector may be isolated from (e.g., physically isolated from) the non-quarantine sector and/or the boot sector. In some examples, code in the quarantine sector may be prevented from performing write actions on other memory sectors, such as the non-quarantine sector and/or the boot sector. In some examples, in response to the second client device receiving an electronic communication, the electronic communication is stored in the quarantine sector of the third memory. In some examples, the electronic communication may comprise the first content item. In some examples, the second client device extracts (via file parsing, for example) a malicious code from the electronic communication to create a sanitized electronic communication. The extraction of the malicious code may comprise (i) scanning the communication for an identified beginning malicious code marker, (ii) flagging each scanned byte between the beginning marker and a successive end malicious code marker, (iii) continuing scanning until no further beginning malicious code marker is found, and/or (iv) creating a new data file by sequentially copying non-flagged data bytes (e.g., all non-flagged data bytes) into a new file that forms a sanitized communication file. In some examples, the second client device transfers the sanitized electronic communication to the non-quarantine sector of the third memory. In some examples, the second client device deletes data remaining in the quarantine sector (e.g., the second client device deletes all data remaining in the quarantine sector). In some examples, the second client device renders the first content item for display on a screen (e.g., a touchscreen, a monitor, etc.) of the second client device using the sanitized electronic communication (e.g., the second client device retrieves the sanitized electronic communication from the non-quarantine sector and/or processes information of the sanitized electronic communication to render the first content item).

In some examples, the content distribution system 501 serves web pages offering opportunities (e.g., content delivery opportunities, such as commercial opportunities for serving advertisements to users visiting the web pages). The content distribution system 501 may comprise a computer store containing data, for each of a plurality of first web pages, defining a plurality of visually perceptible elements, wherein the plurality of visually perceptible elements correspond to the plurality of first web pages. In some examples, each of the first web pages belongs to one of a plurality of web page owners. In some examples, each of the first web pages displays at least one active link associated with a commerce object associated with a buying opportunity of a selected one of a plurality of merchants. In some examples, the selected merchant, the outsource provider, and the owner of the first web page displaying the associated link are each third parties with respect to one other. The content distribution system 501 may comprise a computer server at the outsource provider, wherein the computer server is coupled to the computer store and programmed to (i) receive from the second client device (e.g., a computer and/or a web browser of the computer) a signal indicating activation of one of the links displayed by one of the first web pages, (ii) automatically identify as the source page the one of the first web pages on which the link has been activated, (iii) in response to identification of the source page, automatically retrieve the stored data corresponding to the source page, and/or (iv) using the data retrieved, automatically generate and transmit to the second client device (e.g., the computer and/or the web browser) a second web page that displays: (A) information associated with the commerce object associated with the link that has been activated, and (B) the plurality of visually perceptible elements visually corresponding to the source page. For example, the information associated with the commerce object may comprise the first content item. Thus, a user of the second client device may be able to view both the first content item and aspects of the source page.

In some examples, the content distribution system 501 (i) provides a content viewer application to a subscriber for installation on the second client device, and/or (ii) receives content items at a transmission server sent from a data source over the Internet, the transmission server comprising a microprocessor and a memory that stores the remote subscriber's preferences for information format, destination address, specified stock price values, and transmission schedule. The microprocessor (i) filters the received content items based upon bids associated with the received content items, wherein one or more bids of the bids are determined by the serving system 508 (and/or other component) based upon a short-term budget provided by the dynamic budget control system 504, (ii) selects the first content item from the filtered content items (based upon a bid associated with the first content item being greater than other bids of other content items of the filtered content items, for example), (iii) formats the first content item into data blocks according to the information format, and/or (iv) transmits the formatted first content item over a wireless communication channel to the second client device (e.g., a wireless device) associated with a subscriber based upon the destination address and transmission schedule, wherein the formatted first content item activates the content viewer application to cause the first content item to display on the remote subscriber computer and/or to enable connection via a universal resource locator (URL) to a data source of the first content item over the Internet when the wireless device is locally connected to the remote subscriber computer and the remote subscriber computer comes online.

In some examples, the content distribution system 501 performs a content-loading process for loading the first content item into a local computer system (e.g., the second client device) which has a system processor and volatile memory and non-volatile memory. In some examples, the content-loading process comprises (i) responding to powering up of the local computer system by requesting from a memory location (e.g., remote storage location) remote from the local computer system the transfer to and storage in the volatile memory of the local computer system of the first content item, (ii) transferring and/or storing the first content item, and/or (iii) displaying the first content item on a screen of the local computer system.

In some examples, the content distribution system 501 comprises (i) a local client computer (e.g., the second client device) generating network access requests for said individual controlled access network accounts, (ii) at least one filtering scheme, (iii) a plurality of sets of logical filtering elements, and/or (iv) a remote Internet Service Provider (ISP) server coupled to said client computer and said Internet computer network, said ISP server associating each said network account to at least one filtering scheme and at least one set of filtering elements, said ISP server further receiving said network access requests from said client computer and executing said associated filtering scheme utilizing said associated set of logical filtering elements.

In some examples, the first content item comprises an image (e.g., a gray scale image). In some examples, the content distribution system 501 halftones the first content item by (i) generating, with a processor, a blue noise mask by encoding changes in pixel values across a plurality of blue noise filtered dot profiles at varying gray levels, (ii) storing the blue noise mask in a first memory location, (iii) receiving a gray scale image and storing the gray scale image in a second memory location, (iv) comparing, with a processor on a pixel-by-pixel basis, each pixel of the gray scale image to a threshold number in the corresponding position of the blue noise mask to produce a binary image array, and/or (iv) converting the binary image array to a halftoned image. In some examples, the halftoned image is transmitted to the second client device.

U.S. Non-Provisional patent application Ser. No. 16/286,812, filed Feb. 27, 2019, is incorporated herein by reference in its entirety. In some examples, the pacing system 506 may be implemented using one, some and/or all of the techniques provided in U.S. Non-Provisional patent application Ser. No. 16/286,812. In some examples, the pacing system 506 may perform one or more of the acts provided in U.S. Non-Provisional patent application Ser. No. 16/286,812 to determine a pacing signal (e.g., the pacing signal 516) based upon a budget (e.g., a short-term budget 512) received from the dynamic budget control system 504.

In some examples, at least some of the disclosed subject matter may be implemented on a client device, and in some examples, at least some of the disclosed subject matter may be implemented on a server (e.g., hosting a service accessible via a network, such as the Internet).

Figure 9:
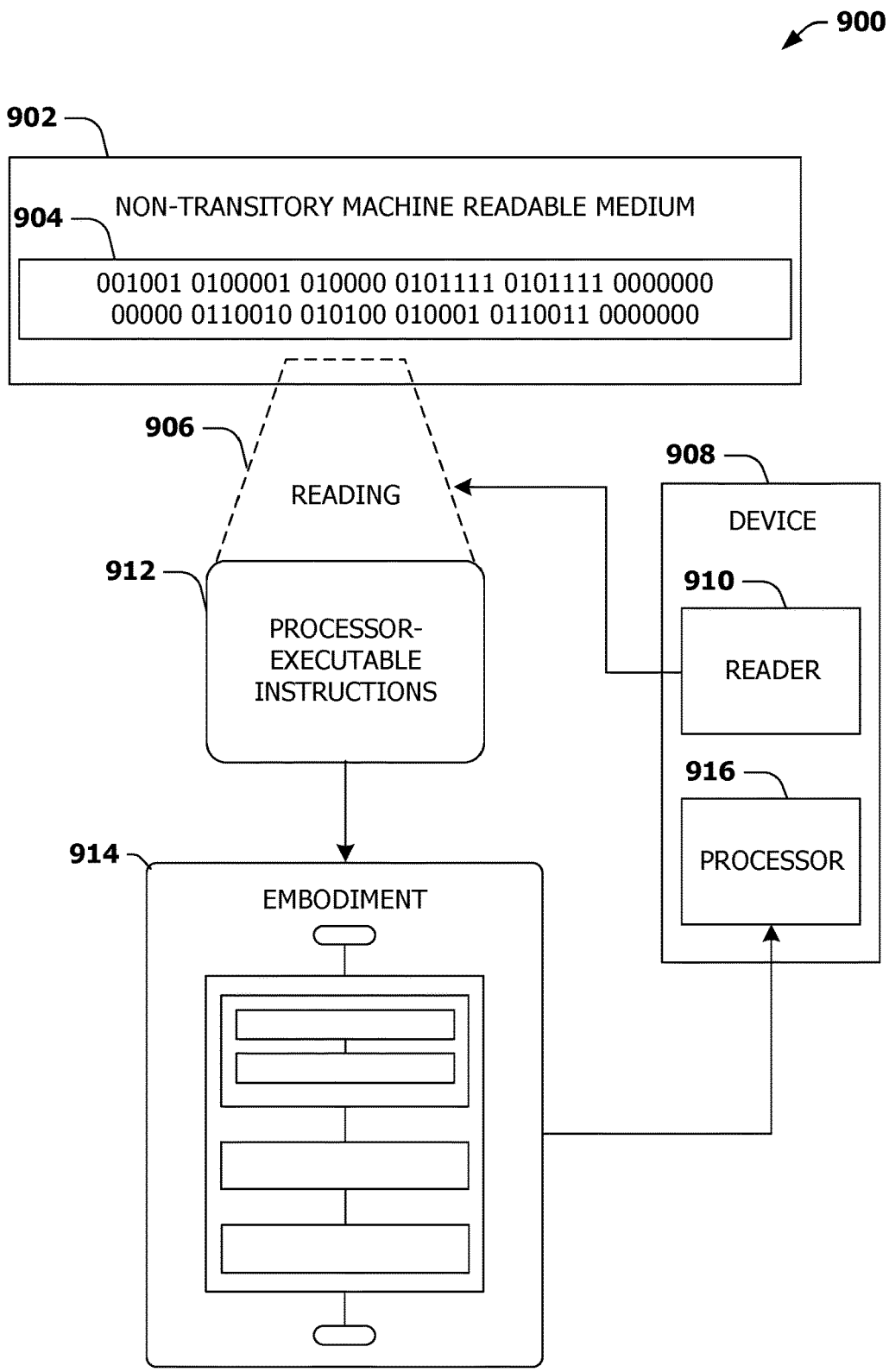
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein (e.g., embodiment 914). The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed, cause performance of operations, such as at least some of the example method 400 of FIG. 4 and/or at least some of the example method 600 of FIG. 6, for example. In some embodiments, the processor-executable instructions 912 are configured to cause implementation of a system, such as at least some of the content distribution system 501 of FIG. 5, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A content distribution system, comprising:
a dynamic budget control system configured to:
  receive campaign budget information from a campaign onboarding platform;
  determine, based upon the campaign budget information, a first budget for a first instance of a first time period;
  in response to determining the first budget, store the first budget in memory of the dynamic budget control system in association with the first time period;
  transmit, to a pacing system, a first set of instructions instructing the pacing system to spend on transmission of content, via communication with a serving system, to a first plurality of client devices using the first budget during the first instance of the first time period;
  receive, from the pacing system, feedback indicating a rate of spending associated with the transmission of content to the first plurality of client devices during the first instance of the first time period;
  update, using the feedback associated with the first instance of the first time period, the first budget to determine a second budget for a second instance of the first time period, wherein a plurality of time periods are between the first instance of the first time period and the second instance of the first time period;
  in response to determining the second budget, clear the memory of the dynamic budget control system and store the second budget in the memory of the dynamic budget control system in association with the first time period; and
  transmit, to the pacing system, a second set of instructions instructing the pacing system to spend on transmission of content, via communication with the serving system, to a second plurality of client devices using the second budget during the second instance of the first time period,
  wherein based upon traffic data relating to network traffic passing through a network appliance exceeding a predefined threshold, at least one of the network appliance or the content distribution system blocks transmission of a content item to a client device to ease traffic load through the network appliance.

2. The content distribution system of claim 1, wherein:
the dynamic budget control system comprises a machine learning model.

3. The content distribution system of claim 1, wherein:
the dynamic budget control system (i) determines the first budget using a machine learning model and (ii) implements a closed-loop process to continuously update the machine learning model to generate an updated version of the machine learning model based upon performance feedback received from at least one of the pacing system, the serving system or one or more other components.

4. The content distribution system of claim 3, wherein:
the closed-loop process reduces errors and produces a more efficient operation of a computer system implementing the machine learning model which improves at least one of operational stability or predictability of operation of the computer system.

5. The content distribution system of claim 1, wherein:
at least one of the network appliance or the content distribution system perform one or more acts if the traffic data is greater than the predefined threshold.

6. The content distribution system of claim 5, wherein:
the one or more acts performed if the traffic data is greater than the predefined threshold comprise collecting additional traffic data relating to the network traffic.

7. The content distribution system of claim 1, wherein:
the dynamic budget control system comprises a data storage and retrieval system for the memory of the dynamic budget control system;
the data storage and retrieval system comprises means for configuring the memory according to a logical table comprising a plurality of logical rows and a plurality of logical columns intersecting the plurality of logical rows to define a plurality of logical cells;
the data storage and retrieval system comprises means for indexing data stored in the logical table, wherein each logical cell of at least one of the plurality of logical cells stores a current budget to use for a campaign;
in response to determining the current budget, the current budget is be stored in a first logical cell of the plurality of logical cells;
in response to determining the first budget, the data storage and retrieval system clears the first logical cell; and after clearing the first logical cell, the data storage and retrieval system stores the first budget in the first logical cell.

8. A method, comprising:

determining a first budget for a first instance of a first time period;

in response to determining the first budget, storing the first budget in memory of a dynamic budget control system in association with the first time period;

transmitting, to a pacing system that is configured to pace spending over a time period based upon a budget, a first set of instructions instructing the pacing system to spend on transmission of content to a first plurality of client devices using the first budget during the first instance of the first time period;

receiving, from the pacing system, feedback indicating a rate of spending associated with the transmission of content to the first plurality of client devices during the first instance of the first time period;

updating, using the feedback associated with the first instance of the first time period, the first budget to determine a second budget for a second instance of the first time period, wherein a plurality of time periods are between the first instance of the first time period and the second instance of the first time period;

in response to determining the second budget, clearing the memory of the dynamic budget control system and storing the second budget in the memory of the dynamic budget control system in association with the first time period; and transmitting, to the pacing system, a second set of instructions instructing the pacing system to spend on transmission of content to a second plurality of client devices using the second budget during the second instance of the first time period, wherein based upon traffic data relating to network traffic passing through a network appliance exceeding a predefined threshold, at least one of the network appliance or a content distribution system blocks transmission of a content item to a client device to ease traffic load through the network appliance.

9. The method of claim 8, wherein:
determining the first budget is performed using a machine learning model.

10. The method of claim 9, wherein:
updating the first budget to determine the second budget is performed using the machine learning model.

11. The method of claim 8, wherein:
the first instance of the first time period corresponds to a first day of a first week; and
the second instance of the first time period corresponds to the first day of a second week after the first week.

12. The method of claim 8, comprising:
determining an average rate of spending over a first instance of a plurality of time periods, wherein:
the first instance of the plurality of time periods comprises the first instance of the first time period; and
updating the first budget to determine the second budget is performed based upon a comparison of the rate of spending associated with the first instance of the first time period with the average rate of spending.

13. The method of claim 8, comprising:
determining an average rate of spending over a first instance of a plurality of time periods, wherein:
the first instance of the plurality of time periods comprises the first instance of the first time period; and
updating the first budget to determine the second budget comprises increasing the first budget to determine the second budget based upon the rate of spending associated with the first instance of the first time period being higher than the average rate of spending.

14. The method of claim 8, comprising:
determining an average rate of spending over a first instance of a plurality of time periods, wherein:
the first instance of the plurality of time periods comprises the first instance of the first time period; and
updating the first budget to determine the second budget comprises decreasing the first budget to determine the second budget based upon the rate of spending associated with the first instance of the first time period being lower than the average rate of spending.

15. A non-transitory machine readable medium having stored thereon processor-executable instructions that when executed cause performance of operations, the operations comprising:

determining a first budget for a first instance of a first time period;

in response to determining the first budget, storing the first budget in memory of a dynamic budget control system in association with the first time period;

transmitting, to a pacing system that is configured to pace spending over a time period based upon a budget, a first set of instructions instructing the pacing system to spend on transmission of content to a first plurality of client devices using the first budget during the first instance of the first time period;

receiving, from the pacing system, feedback indicating a rate of spending associated with the transmission of content to the first plurality of client devices during the first instance of the first time period;

updating, using the feedback associated with the first instance of the first time period, the first budget to determine a second budget for a second instance of the first time period, wherein a plurality of time periods are between the first instance of the first time period and the second instance of the first time period;

in response to determining the second budget, clearing the memory of the dynamic budget control system and storing the second budget in the memory of the dynamic budget control system in association with the first time period; and transmitting, to the pacing system, a second set of instructions instructing the pacing system to spend on transmission of content to a second plurality of client devices using the second budget during the second instance of the first time period, wherein based upon traffic data relating to network traffic passing through a network appliance exceeding a predefined threshold, at least one of the network appliance or a content distribution system blocks transmission of a content item to a client device to ease traffic load through the network appliance.

16. The non-transitory machine readable medium of claim 15, wherein:
determining the first budget is performed using a machine learning model.

17. The non-transitory machine readable medium of claim 16, wherein:
updating the first budget to determine the second budget is performed using the machine learning model.

18. The non-transitory machine readable medium of claim 15, wherein:
the first instance of the first time period corresponds to a first day of a first week; and
the second instance of the first time period corresponds to the first day of a second week after the first week.

19. The non-transitory machine readable medium of claim 15, the operations comprising:
determining an average rate of spending over a first instance of a plurality of time periods, wherein:
the first instance of the plurality of time periods comprises the first instance of the first time period; and
updating the first budget to determine the second budget comprises increasing the first budget to determine the second budget based upon the rate of spending associated with the first instance of the first time period being higher than the average rate of spending.

20. The non-transitory machine readable medium of claim 15, the operations comprising:
determining an average rate of spending over a first instance of a plurality of time periods, wherein:
the first instance of the plurality of time periods comprises the first instance of the first time period; and
updating the first budget to determine the second budget comprises decreasing the first budget to determine the second budget based upon the rate of spending associated with the first instance of the first time period being lower than the average rate of spending.

* * * * *